United States Patent [19]

Henriksson et al.

[11] Patent Number: 5,233,635
[45] Date of Patent: Aug. 3, 1993

[54] RECEIVING METHOD AND RECEIVER FOR DISCRETE SIGNALS

[75] Inventors: Jukka A. Henriksson, Espoo; Kimmo J. Raivio, Helsinki, both of Finland

[73] Assignee: Oy Nokia AB, Helsinki, Finland

[21] Appl. No.: 705,569

[22] Filed: May 24, 1991

[30] Foreign Application Priority Data

Jun. 14, 1990 [FI] Finland .............................. 902992

[51] Int. Cl.⁵ .............................................. H04L 25/49
[52] U.S. Cl. ........................................ 375/99; 375/14; 375/39; 364/724.19
[58] Field of Search .................... 375/14, 17, 39, 99; 364/724.16, 724.19, 724.2

[56] References Cited

U.S. PATENT DOCUMENTS

| 4,303,895 | 12/1981 | Ohnishi et al. | 333/18 |
|---|---|---|---|
| 4,577,329 | 3/1986 | Brie et al. | 375/14 |
| 4,615,038 | 9/1986 | Lim et al. | 375/14 |
| 4,669,092 | 5/1987 | Sari et al. | 375/14 |
| 4,689,805 | 8/1987 | Pyhälammi et al. | 375/11 |
| 4,713,829 | 12/1987 | Eyuboglu | 375/37 |
| 4,866,736 | 9/1989 | Bergmans | 375/14 |
| 4,905,254 | 2/1990 | Bergmans | 375/14 |
| 4,985,900 | 1/1991 | Rhind et al. | 375/10 |

FOREIGN PATENT DOCUMENTS

WO89/08360 9/1989 PCT Int'l Appl.

OTHER PUBLICATIONS

Patent Abstracts of Japan, vol. 13, No. 413 (E-820) 12 Sep. 1989 & JP-A-11 051 321 (Matsushita) 14 Jun. 1989.
International Joint Conference on Neural Networks (IJCNN), vol. I, 17 Jun. 1990, San Diego, pp. 223-228, Kohonen et al., "Combining Linear Equalization and Self-Organizing Adaptation in Dynamic Discrete-Signal Detection".
An Adaptive Discrete-Signal Detector Based on Self-Organizing Maps, Teuvo Kohonen et al., Helsinki University of Technology and Nokia Research Center, Transmission Systems, pp. II-249-252.

Primary Examiner—Curtis Kuntz
Assistant Examiner—Young Tse
Attorney, Agent, or Firm—Finnegan, Henderson, Farabow, Garrett and Dunner

[57] ABSTRACT

The invention relates to an adaptive receiving method and a receiver comprising an adaptive equalizing device for processing a received signal. The receiver further comprises an adaptive detector utilizing the self-organizing map principle and operationally connected after the adaptive equalizer. The adaptive equalizer is controlled on the basis of an error between a processed signal and a detected signal.

10 Claims, 3 Drawing Sheets

RECEIVING METHOD AND RECEIVER FOR DISCRETE SIGNALS

FIELD OF THE INVENTION

The invention relates to a method of receiving discrete signals, in which a received discrete signal is processed prior to detection to compensate for distortion caused by the transmission channel.

BACKGROUND OF THE INVENTION

A common problem with the reception of digital signals is that in addition to noise the transmission channel also causes linear and non-linear distortions in the signal. Prior art methods for eliminating the effects of linear distortions from the received signal include linear and non-linear transversal equalizers, which may be adaptive so that they adapt to possible changes in the transmission channel during the signal transmission.

To compensate for non-linear distortions, International Application PCT/FI89/00037 discloses an adaptive detection method for quantized signals, which utilizes the self-organizing map principle during detection to automatically take into account the effects of changes taking place in the channel properties on a signal constellation used in the detection. The same method is described in Kohonen, Raivio, Simula, Ventä, Henriksson: *An Adaptive Discrete-Signal Detector Based on Self-Organizing Maps*. International Joint Conference on Neural Networks IJCNN-90-WASH DC, Jan. 15-19, 1990, Washington D.C., Vol. II, P. II-249-52.

The above-described solutions are not, however, able to operate in an optimal way in surroundings where both distortion types occur simultaneously. A linear or non-liner transversal equalizer is not able to compensate for non-linear distortions (or is able only limitedly), and the map method compensating for non-linear distortions is disturbed by the linear distortions.

SUMMARY OF THE INVENTION

The object of the present invention is to provide a receiving method and a receiver which are able to efficiently compensate for non-linear and linear distortions simultaneously.

This is achieved by means of a method according to the invention, wherein the processed discrete signal is detected by an adaptive detection method based on a self-organizing map and the distortion compensation to be performed prior to detection is controlled on the basis of an error between an instantaneous signal sample of the processed signal and a signal constellation formed by the self-organizing map.

The invention eliminates or alleviates the drawbacks of the prior methods by introducing a combined method in which the signal is first equalized linearly by a desired adaptive method, e.g., by using a linear transversal equalizer or decision-feedback equalizer and the equalized signal is detected by a detection method based on the self-organizing map. Thereafter the error of an instantaneous signal sample of the equalized signal is calculated with respect to a signal constellation formed by the self-organizing map. The error term so obtained is used to control the linear equalizer, e.g., the determination of the tap coefficients of the equalizer. In one embodiment of the invention, the equalization is made even more efficient by using and controlling simultaneously both a conventional linear equalizer and a decision-feedback equalizer.

As compared with a conventional transversal equalizer, the most significant difference is that the error term controlling the linear equalizer is calculated in this method with respect to an adaptive signal constellation. In traditional methods, the signal constellations and decision limits used in the detection are fixed so that they do not take into account changes possibly taking place in the transmission channel due to the aging of the apparatus or for some other reasons.

In the preferred embodiment of the invention, the signal constellation formed by the self-organizing map, and to be used in the detection, is corrected on the basis of the signal the linear distortion of which has been equalized. In an alternative embodiment of the invention, the correction of the signal constellation is accomplished by the received signal as such, which method in most cases has a lower performance than the preferred method; but it may provide advantages in cases where non-linear distortion is so extensive that the linear equalizer is not able to converge in the initial situation. In a further embodiment of the invention, it is possible to select adaptively between the two above-mentioned alternatives.

DESCRIPTION OF THE DRAWINGS

The invention will now be described in greater detail by means of embodiments with reference to the attached drawings, in which

FIGS. 7 and 8 are block diagrams of two receivers of the invention when the signal to be received is a 16QAM signal or the like.

DETAILED DESCRIPTION OF THE INVENTION

The primary purpose of a typical communication system is to transmit data or messages from one point to another. To achieve this, the messages must be coded and modulated in an optimal way to make them as suitable for transmission as possible. Especially long-distance communication usually requires a high-frequency carrier, which is modulated by the coded messages. In the well-known amplitude modulation (AM), for instance, the carrier is simply multiplied by the message signal. Phase and frequency modulations are also used generally.

The transmission channel bridges the two ends of the system. The carrier and the message are usually affected by signal attenuation, noise, interference, distortion, etc. A standard method to suppress noise and interference is to use proper filtering. For linear distortions, various so-called equalizing techniques have been developed. However, many distortions have non-linear characteristics, which make them difficult to compensate. In digital communication, modulating signals assume only discrete values at sampled time positions. The problem at the receiver is thus to identify the discrete values, e.g. $\pm A_c$, $\pm 3A_c$, . . . One of the most efficient modulation techniques is the Quadrature-Amplitude Modulation (QAM). It is based on having two identical carriers simultaneously in the same channel with a 90 degrees phase shift. Both carrier components can be modulated independently, whereby the signal x(t) is obtained from the equation $$x(t)=x_i(t)A_c \cos(\omega_c t+\theta)-x_q(t)A_c \sin(\omega_c t+\theta) \quad (1)$$

Figure 1A:
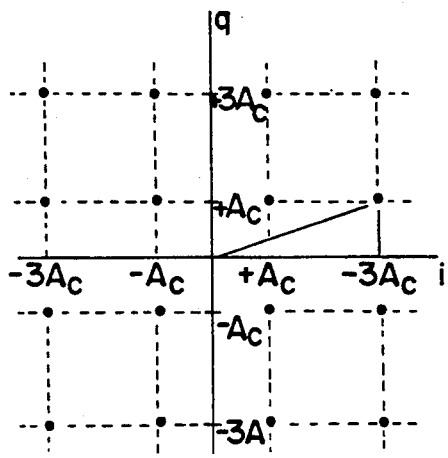
FIG. 1A illustrates a signal constellation to be used with a 16QAM signal.
Figure 1B:
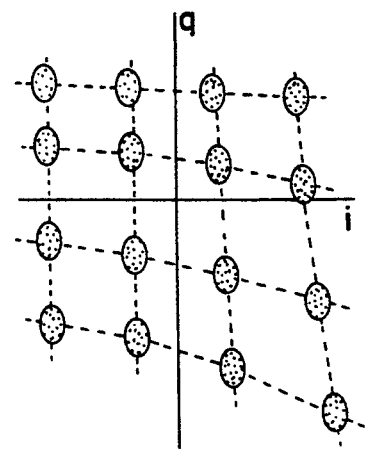
FIG. 1B illustrates non-linear distortion of such a signal constellation.

The coefficient $x_i(t)A_c$ is called the "inphase" i component and the coefficient $x_q(t)A_c$ the "quadrature" q component. In the coordinate system shown in FIG. 1A, the horizontal axis represents the phase of the i component and the vertical axis represents the phase of the q component so that the phase of the signal x(t) is the sum of the two component phases. In a digital QAM signal, the i and q components can take only discrete values. Thus, in the above-mentioned coordinate system, each possible (i,q) pair occupies a discrete grid point so that a so-called signal constellation is formed. Demodulation is an inverse operation to modulation, i.e. it attempts to recover the discrete $x_i$ and $x_q$ codes from the transmitted waveform. More precisely, the problem is to detect discrete signal values $\pm A_c$, $\pm 3A_c$, etc. when the signal levels are affected by the noise, interference, distortions, etc. FIG. 1A also shows the point density function (pdf) of the received signals in ideal circumstances, whereby the function contains peaks at the possible grid points. In FIG. 1B, the peaks of the pdf have become widened due to noise and, moreover, the peaks themselves have been shifted due to distortion. Distortion is usually caused by slowly changing phenomena, such as a change in temperature in the circuitry or transmission medium so that in the short term, let alone noise, the discrete signal levels of two successive received signals are not too far apart. Linear distortion can easily be compensated for by various equalization techniques but non-linear distortion is more difficult to cope with.

Simultaneous equalization of linear and non-linear distortion is accomplished efficiently according to the basic principles of the invention by equalizing the linear distortion of the received signal and by detecting the equalized signal by an adaptive detection method based on a self-organizing map. In the detection method, the used signal constellation adaptively adapts to the signal states of the received signal distorted by the transmission channel. The distortion may take place, e.g., from the ideal signal constellation of FIG. 1A to the non-linearly distorted signal constellation of FIG. 1B. In the invention, the linear equalizer is further controlled on the basis of an error between an instantaneous signal sample of a processed signal y(n) and the signal constellation formed by the self-organizing map.

Figure 3:
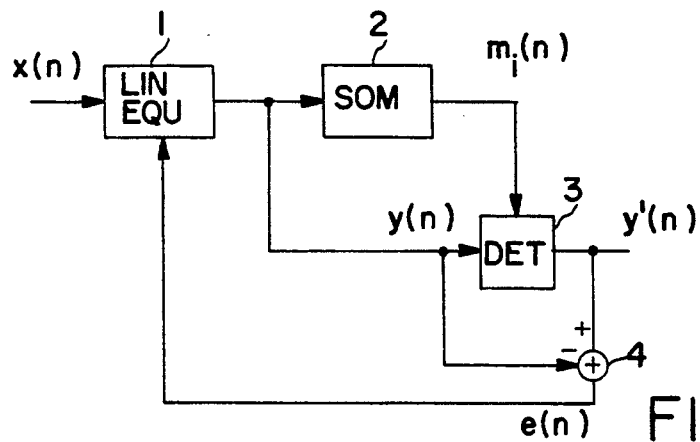
Figure 6:
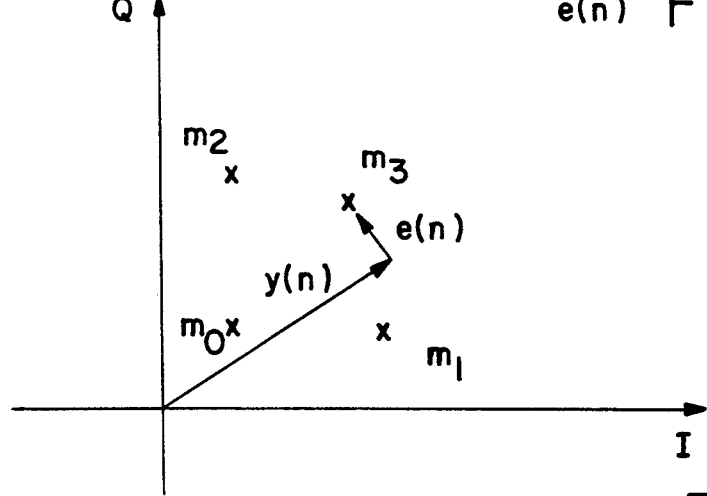
FIG. 6 shows one quadrant of the 16QAM signal constellation, illustrating the determination of an error term e(n) used in the method of the invention.

FIG. 3 is a block diagram of a preferred embodiment of a receiver for discrete signals according to the invention for realizing the method. A discrete signal x(n) received from the transmission channel is fed to the input of a linear equalizer 1 to reduce or eliminate the linear distortion caused by the channel. An output signal y(n) from the equalizer 1, i.e. the processed received signal is fed to a control input in a self-organizing map 2 and to an input in a detector 3. Adaptive values are developed in the cells of the self-organizing map 2, which values follow up changes taking place in time in the discrete signal states of the signal y(n) and form an adaptive signal constellation mi(n) which is fed to the detector 3, in which the $m_i$ values are used as decision levels so that the detector interprets the nearest signal point in the signal constellation $m_i(n)$ as the value of the instantaneous signal sample of the signal y(n) and gives this value to the detected signal y'(n). The detection error is e(n)=y'(n)−y(n) and it is used for controlling the equalizer 1 according to the invention. In the preferred embodiment of the invention the processed signal y(n) and the detected signal y'(n) are fed to a subtraction circuit 4 which forms the difference signal e(n) of these two signals. The difference signal is fed back to the linear equalizer 1 to adaptively alter the coefficients of the linear equalizer in a suitable manner by using, e.g., the gradient method (MMSE criterion) or the zero compression method. The formation of the error term e(n) is illustrated in FIG. 6, which shows one quadrant in the signal constellation $m_i(n)$ formed by the self-organizing map 2 in the case of a 16QAM signal. On account of the linear distortion occurring in the channel, a point $m_3$ in the signal constellation has shifted from its ideal place. The error term e(n) to be used for controlling the linear equalizer is calculated by the instantaneous signal sample y(n) obtained from the output of the linear equalizer 1 and the signal point $m_3$ used in the detection.

Figure 4:
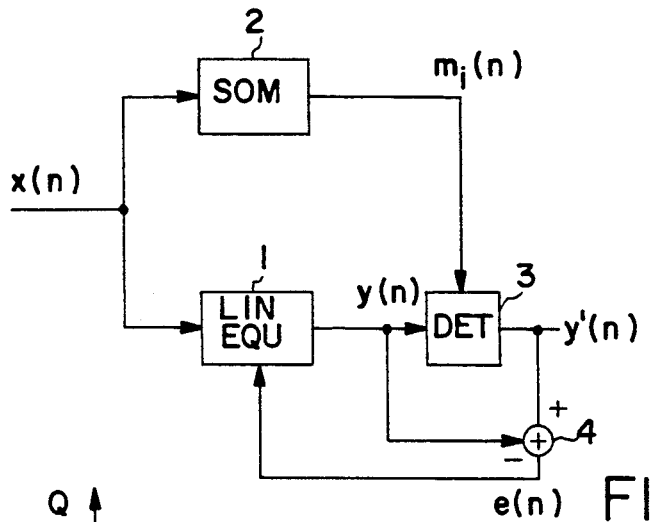

FIG. 4 shows another receiver realizing the method of the invention. The received signal x(n) is fed to the inputs of the self-organizing map 2 and the linear equalizer 1. The output signal y(n) of the equalizer 1 is detected by the detector 3, at which the self-organizing map 2 forms the adaptive signal constellation $m_i(n)$ used in the detection. A difference signal e(n) is formed from the signals y(n) and y'(n) by the subtraction circuit 4, which difference signal controls the linear equalizer 1 according to the invention. In this embodiment, the self-organizing map forms the signal constellation $m_i(n)$ to be used in the detection directly on the basis of the received signal x(n), which may be of advantage when the signal x(n) is so severely distorted that the equalizer 1 is not able to converge in the initial situation.

Figure 5:
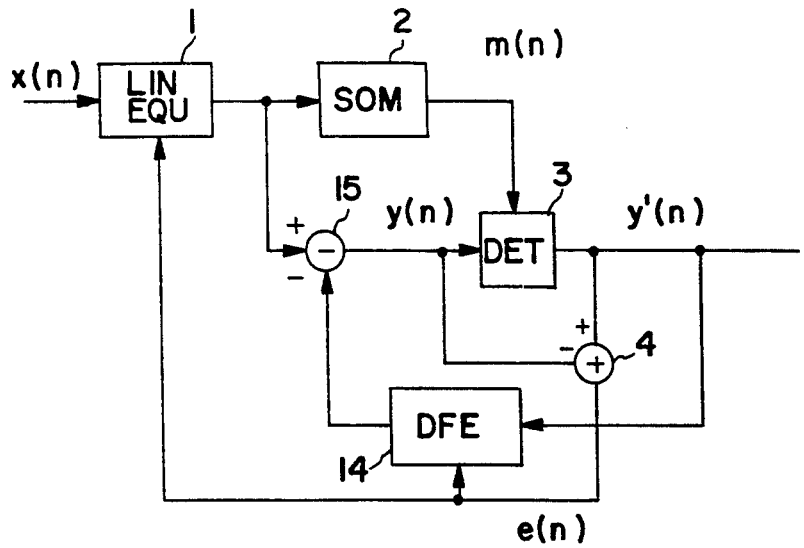
FIGS. 3, 4 and 5 are block diagrams of various receivers according to the invention.

FIG. 5 shows a third receiver realizing the method of the invention. This receiver is formed by adding a decision-feedback equalizer (DFE) to the receiver of FIG. 3. Accordingly, the blocks indicated with the same reference numerals in FIGS. 3 and 4 represent the same functions or circuits. In FIG. 5, the decision-feedback equalizer comprises a unit 14 accomplished e.g. by a transversal filter. The detected signal y'(n) is applied to the input of the unit 14, and it is processed by the unit, whereafter the output signal of the unit 14 is subtracted from the output signal of the linear equalizer 1 in a subtraction circuit 15 and the obtained difference signal is fed to the detector 3. The error signal e(n) is also fed to the unit 14, and it controls the formation of the coefficients of the unit 14 similarly as in the case of the equalizer 1. This combination makes the equalization of the distortion even more efficient.

The decision-feedback equalizer can also be similarly positioned in the receiver of FIG. 4. It is also possible to realize the receiver of the invention merely by the decision-feedback equalizer without the equalizer 1.

In the following the operation of the different blocks of FIGS. 3, 4 and 5 will be described in greater detail. The equalizer 1 may be any adaptive linear or non-linear equalizer known in the art, which is used to compensate for channel distortions and intersymbol interference. The most common equalizer structure is an adaptive transversal filter, the output signal of which is obtained from the equation $$y(n) = \sum_{k=-N}^{N} c(k)x(n - k) \quad (3)$$

where the tap coefficients c(n) represent the impulse response of the filter and y(n) is an estimate for the nth input sample. Various suitable equalizer structures are described e.g. in Proakis: *Advances in Equalization for Intersmol Interference*, Advances in Communication Systems Theory and Applications, Vol. 4, Academic Press, 1975.

The adaptive detection based on the self-organizing map, which is performed by the blocks 2 and 3, is described in International Patent Application PCT/FI89/00037 and the following articles: Kohonen, Raivio, Simula, Ventä, Henriksson: *An Adaptive Discrete-Signal Detector Based on Self-Organizing Maps*. International Joint Conference on Neural Networks IJCNN-90-WASH DC, Jan. 15-19, 1990, Washington D.C., Vol. II, P. II-249-52; T. Kohonen, *Clustering, Taxonomy, and Topological Maps of Patterns*, Sixth International Conference on Pattern Recognition, Munich, Germany, Oct. 19-22, 1982, p. 114-128; T. Kohonen, *Self-Organization and Associative Memory*, Springer-Verlag, Series in Information Sciences, Vol. 8, Berlin-Heidelberg-New York-Tokyo, 1984, 2nd ed. 1988.

Figure 2A:
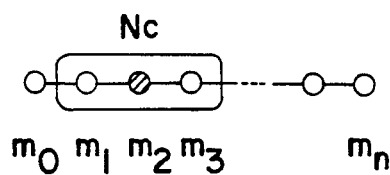
FIGS. 2A and 2B illustrate one- and two-dimensional self-organizing maps.
Figure 2B:
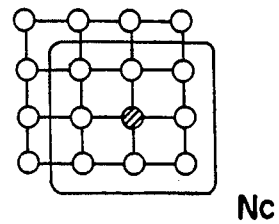

These publications are incorporated in the description by reference. The structure and operation of the blocks 2 and 3 will, however, be described in short below. A typical self-organizing map is a linear array of learning cells, each cell containing an adaptive parameter or signal point $m_i$. The map may be one-dimensional (FIG. 2A) or two-dimensional (FIG. 2B). When the ideal and distorted signal values are one-dimensional, the $m_i$ values are also scalars. In the beginning of the communication, the $m_i$ values are initialized to the ideal values or according to the signal levels received in the beginning of the transmission, or they may be random values because the $m_i$ values will effectively converge to possible asymptotic values of the received quantized values in the course of the self-organizing learning process. The adaptive and time-varying signal identification performed by the blocks 2 and 3 proceeds according to the following rules that are based on the original self-organizing algorithm.

(i) At each discrete time instant t, the cell c with the best matching parameter $m_c(t)$ for the detection result of the current received signal sample x(t) is determined. In the preferred embodiment of the invention, the parameter $m_i$ to which the Euclidean distance of the signal sample is the smallest is chosen, i.e.

$$\| x(t) - m_c(t) \| = \min_i \{ \| x(t) - m_i(t) \| \} \quad (4)$$

(ii) Adapt the parameters $m_i$ in the neighborhood $N_c$ of the chosen cell c $$m_i(t + 1) = m_i(t) + \alpha[x(t) - m_i(t)], \quad i = c$$
$$m_i(t + 1) = m_i(t) + \beta[x(t) - m_i(t)], \quad i \in N_c, i \neq c$$
$$m_i(t + 1) = m_i(t) \quad i \notin N_c$$

The topological neighborhood $N_c$ consists of the selected cell itself and its direct neighbors up to depth 1, 2, ... (see FIG. 2B).

The neighborhood learning is always applied symmetrically in each direction in the array of adaptive cells. Because cells near the edges of the array may not have neighbors in both directions, the learning causes some bias in the $m_i$ values of these cells towards the parameter in the center of the group. In one embodiment of the invention, this is compensated by modifying the input signal x(t) to the form $b_i + d_i x(t)$, in which $b_i$ and $d_i$ are node-specific parameters, i.e. the space of the input signal x(t) is effectively enlarged.

The ability of the method to preserve a signal space topology becomes even more evident when the quantization of the signal space is two- or multi-dimensional, i.e. the ideal signal values occupy the coordinate values of the grid points of a rectangular area and the $m_i$ values are two-dimensional vectors. Otherwise, the above adaptation equations are directly applicable to the two-dimensional case, too. Two-dimensional signal quantization is utilized in the so-called QAM coding. Therefore it is advantageous to use a respective rectangular array of learning cells familiar from the multitude of demonstrations given of the self-organizing maps.

As a result of such adaptation based on self-organizing, the algorithm is able to follow up distortions in the signal constellation if the distortions in the receiver are such that the local order of the peaks of the point density function is preserved. The grid points in a two-dimensional space may be shifted, zoomed, rotated, etc., in various ways but still the order of the signal levels tends to be preserved, i.e., the rectangular grid-like structure is preserved.

Figure 7:
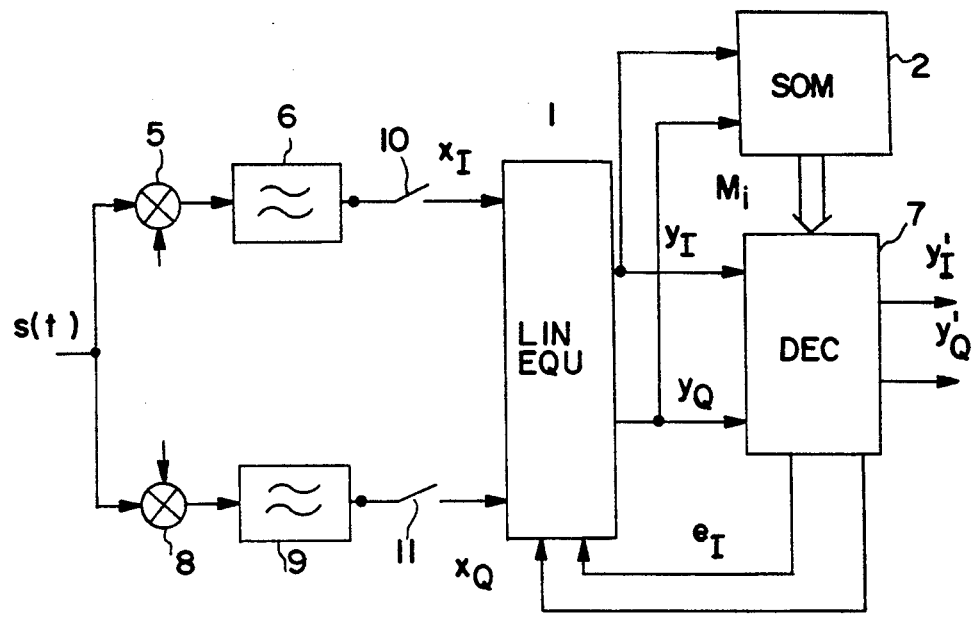
Figure 8:
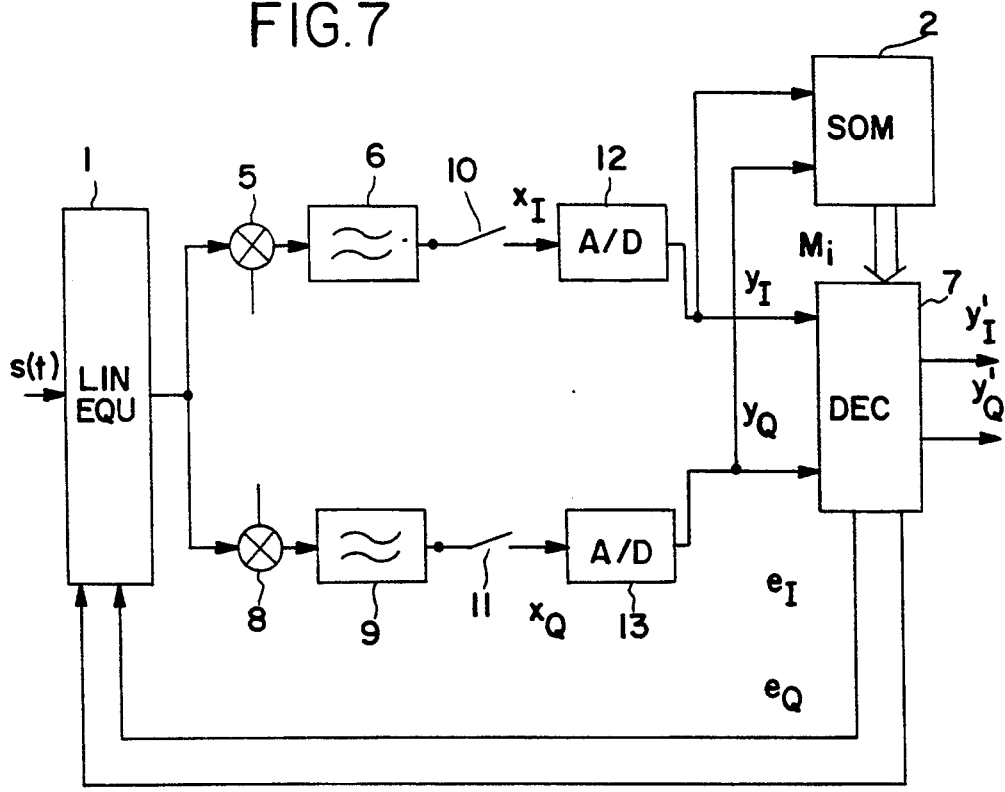

FIGS. 7 and 8 show two receivers in which the received signal s(t) may be e.g. an N-phase modulated signal or a MQAM signal, such as a 16QAM signal. In FIG. 7, the received signal s(t) is detected to the base frequency by means of mixers 5 and 8 by using a local oscillator 14 and a phase shifter 14 to produce local carriers having a phase shift of 90°. The output signals of the mixers 5 and 8 are lowpass-filtered in a usual way in filters 6 and 9, respectively. The lowpass-filtered signals are sampled, one sample for each transmitted symbol, by switches 10 and 11 which may be e.g. sampling and holding circuits. After sampling, signal samples $x_I(n)$ and $x_Q(n)$ occurring at symbol time slots T are obtained, which are the quadrature-phase signal components of the QAM signal.

The signal samples $x_I(n)$ and $x_Q(n)$ are applied to the linear equalizer 1, in which the sample is subjected to an equalization depending on the linear equalizer used in each particular case. For example, a transversal equalizer comprises signal samples in the memory from the time period of several symbols and by suitably emphasizing these signal samples in a manner depending on the tap coefficients and the impulse response of the equalizer, a corrected signal pair $y_I(n)$ and $y_Q(n)$ is made to correspond to each sampled time position. The samples $y_I(n)$ and $y_Q(n)$ are digital words of e.g. 8 bits.

Thereafter the signal samples $y_I(n)$ and $y_Q(n)$ are applied both to a decision circuit 7 and the self-organizing network 2, which together form an adaptive detector. The self-organizing map 2 calculates an optimal signal constellation $m_i$ for a two-dimensional signal by a method based on self-organizing maps. The most probable values are thereby calculated by means of the detected signal samples $y_I(n)$ and $y_Q(n)$ for the signal points $m_i$, taking into account the noise, interference and distortions contained in the signal. The decision circuit 7 utilizes these signal points $m_i$ as reference points when it decides to which transmitted symbol the received signal sample pair $y_I(n)$ and $y_Q(n)$ corresponds. In the preferred embodiment of the invention, the criterion for deciding is that the received signal sample pair corresponds to the reference point $m_i$ to which the Euclidean distance $\|y - m_i\|$ is the smallest. The decision circuit 7 also calculates an error term e the components of which are $$e_I = y_I - y'_I$$

$$e_Q = y_Q - y'_Q$$

where $y'_I$ and $y'_Q$ are the quadrature-phase output signals of the decision circuit 7. The error term e is used as described above for calculating and updating the tap coefficients of the linear equalizer.

The receiver of FIG. 8 is otherwise similar to that of FIG. 7 except that the linear equalizer is now an analog equalizer which is positioned to directly equalize a received signal s(t) before the signal is mixed with the base frequency. The signals are not converted into digital form until by analog-to-digital converters 12 and which are positioned after the sampling switches 10 and 11.

Many of the operational blocks shown in FIGS. 3, 4, 5, 7 and 8 can also be realized programmatically by means of a microprocessor or the like, whereby the self-organizing map 2, the detector 3 and the decision circuit 7 shown as separate in the figures may, in fact, be different parts of the programme of one and the same processor.

It is further possible to combine the operations of FIGS. 3 and 4 in the receiver in such a way that the received signal x(n) directly or the signal y(n) processed by the equalizer 1 can be connected adaptively according to a given decision making criterion as the control signal of the self-organizing map 2. In the beginning of the transmission, for instance, the control of the map 2 may be connected directly to the signal to be received to facilitate the converging of the linear equalizer 1 and then to the processed signal for the rest of the transmission time.

We claim:

1. A receiver for discrete signals, comprising
   adaptive equalizer means controlled by an error signal for equalizing a received signal to obtain an equalized signal;
   means for subtracting the obtained equalized signal from a feedback signal to obtain a decision-feedback equalized signal;
   adaptive detecting means including an adaptive signal constellation for detecting said decision-feedback equalized signal and outputting a detected signal;
   self-organizing map means for generating said adaptive signal constellation;
   means for providing said error signal, said error signal corresponding to an error between said decision-feedback equalized signal and said output detected signal and;
   an adaptive decision-feedback equalizer controlled by the error signal for processing said detected signal to provide said feedback signal.

2. A receiver according to claim 1, wherein said self-organizing map means is responsive to said received signal for generating said adaptive signal constellation.

3. A receiver according to claim 1, wherein said self-organizing map is responsive to said equalized signal for generating said adaptive signal constellation.

4. A receiver according to claim 1, wherein said received signal is a QAM signal, and said adaptive signal constellation is multi-dimensional.

5. A receiver according to claim 2, wherein said received signal is a QAM signal, and said adaptive signal constellation is multi-dimensional.

6. A receiver according to claim 3, wherein said received signal is a QAM signal, and said adaptive signal constellation is multi-dimensional.

7. A receiver for discrete signals, comprising means for subtracting a received signal from a feedback signal to obtain a decision-feedback equalized signal.
   adaptive detecting means including an adaptive signal constellation for detecting said decision-feedback equalized signal and outputting a detected signal,
   self-organizing map means for generating said adaptive signal constellation,
   an adaptive decision feedback equalizer controlled by an error signal for providing said feedback signal by processing said detected signal, and
   means for providing said error signal, said error signal corresponding to an error between said decision-feedback equalized signal and said detected signal.

8. A receiver according to claim 7, wherein said self-organizing map means is responsive to said received signal for generating said adaptive signal constellation.

9. A receiver according to claim 7, wherein said received signal is a QAM signal, and said adaptive signal constellation is multi-dimensional.

10. Receiver according to claim 8, wherein said received signal is a QAM signal, and said signal constellation is multi-dimensional.

* * * * *

UNITED STATES PATENT AND TRADEMARK OFFICE
CERTIFICATE OF CORRECTION

PATENT NO. : 5,233,635
DATED : August 3, 1993
INVENTOR(S) : Jukka A. Henriksson et al.

It is certified that error appears in the above-indentified patent and that said Letters Patent is hereby corrected as shown below:

On the title page, Item [75]:
    Inventors should read as follows:

Jukka A. Henriksson, Espoo; Kimmo J. Raivio, Vantaa; Teuvo Kohonen, Espoo, all of Finland Signed and Sealed this Sixteenth Day of August, 1994

Attest:

BRUCE LEHMAN

*Attesting Officer*      *Commissioner of Patents and Trademarks*